United States Patent
Otsuka et al.

(10) Patent No.: US 6,325,841 B1
(45) Date of Patent: Dec. 4, 2001

(54) PURIFYING AGENT AND PURIFICATION METHOD FOR HALOGEN-CONTAINING EXHAUST GAS

(75) Inventors: Kenji Otsuka; Satoshi Arakawa; Ryuji Hasemi; Yutaka Amijima; Norihiro Suzuki, all of Kanagawa-ken (JP)

(73) Assignee: Japan Pionics., Ltd., Tokyo (JP)

( * ) Notice: Subject to any disclaimer, the term of this patent is extended or adjusted under 35 U.S.C. 154(b) by 0 days.

(21) Appl. No.: 09/530,951

(22) PCT Filed: Aug. 4, 1999

(86) PCT No.: PCT/JP99/04201

§ 371 Date: May 16, 2000

§ 102(e) Date: May 16, 2000

(87) PCT Pub. No.: WO00/16881

PCT Pub. Date: Mar. 30, 2000

(30) Foreign Application Priority Data

Sep. 22, 1998 (JP) .................................................. 10-268067

(51) Int. Cl.$^7$ .................................................. B01D 53/04
(52) U.S. Cl. .................................. 95/132; 95/131; 95/142; 95/901
(58) Field of Search .............................. 95/131, 132, 901, 95/142; 423/240 R, 240 S

(56) References Cited

U.S. PATENT DOCUMENTS

| | | | | |
|---|---|---|---|---|
| 4,421,533 | * | 12/1983 | Nishino et al. | 95/901 X |
| 4,594,231 | * | 6/1986 | Nishino et al. | 95/131 X |
| 5,536,302 | * | 7/1996 | Golden et al. | 95/901 X |
| 5,756,060 | * | 5/1998 | Otsuka et al. | 423/240 S X |
| 6,022,489 | * | 2/2000 | Izumikawa et al. | 423/240 S X |

FOREIGN PATENT DOCUMENTS

| | | | |
|---|---|---|---|
| 58-122025 | | 7/1983 | (JP) . |
| 61-061618 | * | 3/1986 | (JP) . |
| 4-210236 | | 7/1992 | (JP) . |
| 5-237324 | | 9/1993 | (JP) . |
| 07-000762 | * | 1/1995 | (JP) . |
| 7-308538 | | 11/1995 | (JP) . |
| 09-099216 | * | 4/1997 | (JP) . |
| 09-155187 | * | 6/1997 | (JP) . |
| 9-155187 | | 6/1997 | (JP) . |
| 09-234337 | * | 9/1997 | (JP) . |

* cited by examiner

Primary Examiner—Robert H. Spitzer
(74) Attorney, Agent, or Firm—Oblon, Spivak, McClelland, Maier & Neustadt, P.C.

(57) ABSTRACT

A cleaning agent and a cleaning process for efficiently removing noxious halogen-based gases such as fluorine, chlorine, boron trifluoride, boron trichloride and tungsten hexafluoride from exhaust gases from semiconductor fabrication processes. The cleaning agent is produced by adherently adding alkali metal formate and/or alkaline earth metal formate to activated carbon, or adherently adding alkali metal hydroxide and/or alkaline earth metal hydroxide together with alkali metal formate and/or alkaline earth metal formate to activated carbon. By exposing exhaust gases to the cleaning agent, noxious halogen-based gases in the exhaust gases are efficiently removed with little desorption of halogen-based gases adsorbed on the cleaning agent. Also, the cleaning treatment is further improved in safety and efficiency by a pre-treatment cleaning agent comprising a metal oxide or a metal hydroxide and a post-treatment cleaning agent prepared by adherently adding sodium formate to a metal oxide.

17 Claims, No Drawings

PURIFYING AGENT AND PURIFICATION METHOD FOR HALOGEN-CONTAINING EXHAUST GAS

TECHNICAL FIELD

The present invention relates to cleaning agents for treating exhaust gases containing harmful halogen-based gases and processes for cleaning the exhaust gases, and more particularly, to cleaning agents for treating halogen-containing exhaust gases discharged from dry etching process of semiconductor fabrication for selectively removing thin film on wafer in predetermined patterns, and cleaning processes for the exhaust gases. In particular, the present invention relates to dry cleaning agents and dry cleaning processes.

BACKGROUND ART

Known cleaning processes for halogen-containing exhaust gases have been generally classified into wet and dry processes. The typical wet process using an aqueous alkali solution as an absorbing solution is an excellent method due to its large treating capacity and wide applicability. However, the wet cleaning process has drawbacks such as low cleaning efficiency, incomplete cleaning of halogen-containing exhaust gases, need for time-consuming maintenance of cleaning apparatus, danger of contamination of products by back streaming water from absorbing solution into semiconductor fabrication apparatus, etc. For these reasons, the wet processes are not used for cleaning exhaust gases from dry etching process. Therefore, the cleaning of exhaust gases from dry etching process have been preformed by a dry cleaning process utilizing physical adsorption or a dry cleaning process in which halogen-based gases are fixed by chemical reactions.

In semiconductor fabrication industries, dry etching techniques have been used for selectively removing parts of silicon dioxide thin films, polysilicon thin films, tungsten thin films or aluminum thin films in predetermined patterns. The etching gases for dry etching are appropriately selected depending on natures of thin films to be etched, and are required to have a high reactivity with thin films and produce reaction products readily volatilizable from thin films. To meet these requirements, halogen-based gases have been widely used as the etching gases, so that exhaust gases from dry etching process inevitably contain various kinds of halogen-based gases according to kinds of halogen-based etching gases used, kinds of thin films to be etched and etching conditions. Therefore, the treatment of exhaust gases requires dry cleaning agents and dry cleaning techniques according to kinds and properties of individual halogen-based gases contained in exhaust gases. The halogen-based gases contained in exhaust gases from dry etching process are generally classified into fluorine-based gases and chlorine-based gases. The fluorine-based gases include fluorine gas, and the chlorine-based gases include chlorine gas. Differences in chemical properties and reactivity between fluorine gas and chlorine gas are important in designing dry cleaning agents and dry cleaning processes.

In dry etching processes, in general, a halogen-based gas is fed into a chamber during etching, and an inert gas is fed after the etching. As a result, an exhaust gas containing the halogen-based gas and an inert gas containing a little or no halogen-based gas enter repeatedly into an exhaust gas cleaning apparatus.

Hitherto, in dry cleaning of fluorine-containing exhaust gases, a cleaning agent utilizing physical adsorptivity of activated carbons has been used. Such a cleaning agent can be produced at a low cost, and can remove a relatively large amount of fluorine gas and fluorine compound gases with a small amount of use. However, fluorine gas contained in exhaust gases, in some cases, explosively reacts with activated carbon. In fact, there have been reported many explosion accidents due to explosive reaction.

To avoid the above problems, a cleaning agent which is composed mainly of a metal hydroxide to utilize its chemical reactivity with fluorine has been employed for dry-cleaning fluorine-containing exhaust gases. For example, Japanese Patent Application Laid-Open No. 9-99216 teaches a cleaning agent for acidic gases, which is composed mainly of strontium hydroxide. The strontium hydroxide-based cleaning agent for acidic gases can be produced at low cost and can remove a relatively large amount of fluorine gas and various fluorine compound gases with a small amount of use. In addition, unlike activated carbon, the cleaning agent can be safely used without any risk of explosive reaction.

Contrary to the dry cleaning of fluorine-containing exhaust gases, in the dry cleaning of chlorine-containing exhaust gases, a cleaning agent utilizing physical adsorptivity of activated carbon is usable without any risk of explosive reaction, thereby enabling production of the cleaning agent at low cost.

In general, activated carbon, when used as a cleaning agent for halogen-containing exhaust gases, shows a relatively large cleaning capability in treatment of continuously flowing exhaust gases. However, the cleaning capability of activated carbon is disadvantageously decreased in treating alternative flow of an exhaust gas containing halogen-based gas and a gas (purge gas) containing no halogen-based gas as experienced in the treatment of exhaust gases from etching process of semiconductor production. This is because the halogen-based gas physically adsorbed on the activated carbon is gradually desorbed by long-term flowing of a gas containing no halogen-based gas. To eliminate this problem, various studies have been made to enhance the cleaning capability of activated carbon by adherently adding various chemical agents to activated carbon and fixing adsorbed halogen-based gas to activated carbon by chemical reaction between the chemical agents and the adsorbed halogen-based gas, thereby preventing the desorption of adsorbed halogen-based gas. For example, Japanese Patent Application Laid-Open No. 58-122025 proposes a method to adherently add alkali metal halides to activated carbon, and Japanese Patent Application Laid-Open No. 4-210236 proposes a method to adherently add alkali metal aluminate or tetraalkylammonium aluminate to activated carbon. However, any of these methods fail to exhibit satisfactory effects.

Also, various cleaning agents using no activated carbon and capable of fixing halogen-based gas by chemical reaction have been developed. For example, Japanese Patent Application Laid-Open No. 9-234337 proposes a cleaning agent prepared by adherently adding sodium formate to a metal oxide composed mainly of copper oxide and manganese oxide. The proposed cleaning agent is very excellent since it can completely fix halogen-based gases, but requires high production cost and is relatively low in cleaning capability as compared to activated carbon-based cleaning agents.

Further, a cleaning agent composed mainly of strontium hydroxide and tri-iron tetroxide (Japanese Patent Application Laid-Open No. 7-308538) shows high cleaning capability in treating exhaust gases containing halogen-based gas in high content. However, when the content of halogen-based gas is low, the cleaning capability is inferior to that of the cleaning agent prepared by adherently adding sodium formate to a metal oxide composed mainly of copper oxide and manganese oxide (Japanese Patent Application Laid-Open No. 9-234337). In addition, the cleaning agent loses water by evaporation during the use, resulting in decrease of the cleaning capability due to drying.

DISCLOSURE OF THE INVENTION

Accordingly, it is an object of the present invention to develop a cleaning agent for dry-cleaning halogen-containing exhaust gases, which is produced at low cost, which has a high cleaning capability and which is safely used even in the cleaning of fluorine-containing exhaust gases. It is another object of the present invention to provide a cleaning agent which is free from desorption of adsorbed halogen-based gases even when the cleaning agent is exposed to the flow of a halogen-free gas for a long period of time after the cleaning treatment, and a cleaning method using the cleaning agent.

As a result of extensive researches for solving the above problems, the present inventors have found that halogen-based gases are efficiently removed from halogen-containing exhaust gases by contacting the halogen-containing exhaust gas with a cleaning agent prepared by adherently adding alkali metal formate and/or alkaline earth metal formate to activated carbon, or a cleaning agent prepared by adherently adding alkali metal hydroxide and/or alkaline earth metal hydroxide in addition to alkali metal formate and/or alkaline earth metal formate to activated carbon. It has been also found that even when exhaust gases to be treated contain fluorine gas or chlorine trifluoride, the cleaning treatment is safely performed by disposing a cleaning agent composed of metal oxide or metal hydroxide on the upstream of the cleaning agent. It has been further found that halogen-based gases desorbed from activated carbon are securely captured by disposing a cleaning agent prepared by adherently adding sodium formate to a metal oxide composed mainly of copper oxide and manganese oxide on the downstream of the cleaning agent. The present invention has been accomplished based on these findings.

Thus, in a first aspect of the present invention, there is provided a cleaning agent for halogen-containing exhaust gases, which comprises activated carbon adherently added with alkali metal formate and/or alkaline earth metal formate, an adhered amount of the alkali metal formate and/or alkaline earth metal formate being 3 to 18% by weight (dry basis) based on the weight of the cleaning agent.

In a second aspect of the present invention, there is provided a cleaning agent for halogen-containing exhaust gases, which comprises activated carbon adherently added with alkali metal hydroxide and/or alkaline earth metal hydroxide in addition to alkali metal formate and/or alkaline earth metal formate, a total adhered amount of the alkali metal formate and/or alkaline earth metal formate and the alkali metal hydroxide and/or alkaline earth metal hydroxide being 3 to 18% by weight (dry basis) based on the weight of the cleaning agent.

In a third aspect of the present invention, there is provided a process for cleaning halogen-containing exhaust gases, which comprises contacting an exhaust gas containing halogen-based gas as noxious component with a cleaning agent comprising activated carbon adherently added with alkali metal formate and/or alkaline earth metal formate.

In a fourth aspect of the present invention, there is provided a process for cleaning halogen-containing exhaust gases, which comprises contacting an exhaust gas containing halogen-based gas as noxious component with a cleaning agent comprising activated carbon adherently added with alkali metal hydroxide and/or alkaline earth metal hydroxide in addition to alkali metal formate and/or alkaline earth metal formate.

BEST MODE FOR CARRYING OUT THE INVENTION

The cleaning agent and the cleaning process of the present invention is mainly applied to the treatment of halogen-containing exhaust gases from etching process of semiconductor production. The cleaning agent according to the present invention is produced by adherently adding alkali metal formate and/or alkaline earth metal formate, and optionally alkali metal hydroxide and/or alkaline earth metal hydroxide to activated carbon.

The activated carbon usable in the present invention is not particularly restricted as long as it has high adsorptivity and particle sizes suitable for use as cleaning agents. The activated carbon usually has a specific surface area of 700 to 2,500 $m^2/g$, preferably 1,000 to 2,500 $m^2/g$, and a particle size of passing through 32 to 4 mesh sieves. Examples of suitable activated carbons include coal activated carbon, charcoal activated carbon, coconut shell activated carbon, etc. Preferred is coconut shell activated carbon.

Examples of preferred alkali metal formates include sodium formate and potassium formate. Examples of preferred alkaline earth metal formates include calcium formate, magnesium formate, barium formate and strontium formate. These formates may be used alone or in combination of two or more. Sodium formate and potassium formate are especially preferred due to their low cost and easy availability.

The alkali metal formate and/or alkaline earth metal formate may be adhered to the activated carbon by any methods as long as the formates are uniformly adhered on the activated carbon. For example, there may be used a method of impregnating activated carbon with an aqueous solution of the alkali metal formate and/or alkaline earth metal formate and then drying the impregnated activated carbon, or a method of sprinkling the aqueous solution over activated carbon while stirring and then drying the sprinkled activated carbon.

The adhered amount of the alkali metal formate and/or alkaline earth metal formate on the activated carbon is 3 to 18%, preferably 5 to 15% by weight based on the weight of dry cleaning agent.

The cleaning agent of the present invention obtained by adherently adding the alkali metal formate and/or alkaline earth metal formate to the activated carbon is considerably reduced in the desorption amount of halogen-based gas when exposed to the flow of a halogen-free gas after the cleaning treatment of halogen-containing exhaust gases. When the conventional activated carbons or the conventional cleaning agents prepared by adherently adding various chemical agents to activated carbon are used in the cleaning treatment of halogen-containing exhaust gases, adsorbed halogen-based gas is easily desorbed upon exposure to the flow of a halogen-free gas after the cleaning treatment. On the contrary, the cleaning agent according to the present invention is reduced in the desorption amount of halogen-based gas even when exposed to the flow of a halogen-free gas, and therefore, considerably improved in cleaning capability as compared to the conventional activated carbons and cleaning agents adhered with chemical agents.

In the cleaning agent of the present invention, the activated carbon may be further adhered with alkali metal hydroxide and/or alkaline earth metal hydroxide in addition to the alkali metal formate and/or alkaline earth metal formate. With such an additional adherent component, the cleaning agent is further reduced in the desorption amount of halogen-based gas, thereby further increasing cleaning capability as compared to cleaning agents adherently added with only formates.

Examples of the alkali metal hydroxides and alkaline earth metal hydroxides include sodium hydroxide, potassium hydroxide, lithium hydroxide, calcium hydroxide, barium hydroxide, strontium hydroxide and magnesium hydroxide. These hydroxides may be used alone or in combination of two or more. Of these hydroxides, sodium hydroxide and potassium hydroxide are especially preferred in view of their low cost and easy availability.

When both the formate (alkali metal formate and/or alkaline earth metal formate) and the hydroxide (alkali metal hydroxide and/or alkaline earth metal hydroxide) are adherently added to activated carbon, the quantitative proportion of these compounds is not particularly restricted, and the equivalent ratio of the formate to the hydroxide is usually 1:0.1–3.0, preferably 1:0.5–2.0, more preferably 1:0.75–1.5. The cleaning agents comprising activated carbon adherently added with both the formate and the hydroxide may be produced by a method of impregnating activated carbon with an aqueous solution containing the formate and the hydroxide in the above equivalent ratio range and then drying the impregnated activated carbon, or a method of sprinkling the aqueous solution to activated carbon under stirring and then drying the sprinkled activated carbon. Alternatively, the cleaning agent may be produced by first adherently adding one of the formate and the hydroxide to the activated carbon and then adherently adding the other.

The total adhered amount of the alkali metal formate and/or alkaline earth metal formate and the alkali metal hydroxide and/or alkaline earth metal hydroxide is 3 to 18% by weight, preferably 5 to 15% by weight based on dried cleaning agent.

In the present invention, the halogen-containing exhaust gases are usually cleaned by passing the halogen-containing exhaust gases through a cylindrical cleaning column packed with a cleaning agent. The cleaning treatment is usually carried out at ordinary temperatures without necessity of additional heating or cooling. The concentration of the halogen-based gas in the exhaust gases to be treated is usually 5% by volume or lower. Although the contact time between the cleaning agent and the exhaust gas is not specifically restricted because it varies depending upon the concentration of the halogen-based gas, the contact time is usually 5 cm/sec or less in terms of superficial linear velocity (LV). The cleaning pressure is not particularly restricted, but the cleaning treatment is usually carried out under atmospheric pressure.

After treating the exhaust gas with the cleaning agent of the present invention, the exhaust gas may be further contacted with a post-treatment cleaning agent capable of fixing the halogen-based gas by chemical reaction. With this post-treatment, the treated gases can be always completely prevented from being contaminated with desorbed halogen-based gas.

As the post-treatment cleaning agent, a cleaning agent, for example, prepared by adherently adding sodium formate to a metal oxide as described in Japanese Patent Application Laid-Open No. 9-234337 is preferably used. The metal oxide is composed mainly of copper oxide and manganese oxide, and may be a mixture further containing another metal oxide such as silver oxide, aluminum oxide, silicon oxide, potassium oxide and sodium oxide. The total amount of copper oxide (II) and manganese oxide (IV) in the mixture is usually 60% by weight or more, and the weight ratio of manganese oxide (IV) to copper oxide (II) is usually 1:0.2–5.0. Such a mixture is commercially available as "hopcalite". The adhered amount of sodium formate is usually 1 to 60 parts by weight based on 100 parts by weight of metal oxides.

The post-treatment is usually performed by contacting the exhaust gas with the post-treatment cleaning agent at ordinary temperature and a superficial linear velocity of 5 cm/sec or less under atmospheric pressure.

The cleaning method using the cleaning agent of the present invention alone and the cleaning method using both the cleaning agent of the present invention and the post-treatment cleaning agent are especially effective for cleaning the exhaust gases containing at least one main gas selected from the group consisting of nitrogen, argon, helium and hydrogen, and at least one halogen-based gas selected from the group consisting of chlorine, bromine, iodine, hydrogen fluoride, hydrogen chloride, hydrogen bromide, hydrogen iodide, boron trifluoride, boron trichloride, silicon tetrafluoride, silicon tetrachloride, titanium tetrachloride, aluminum chloride, germanium tetrafluoride and tungsten hexafluoride.

Before treating the halogen-containing exhaust gases with the cleaning agent of the present invention, the exhaust gases may be contacted with a pre-treatment cleaning agent to remove in advance fluorine or chlorine trifluoride which tends to violently react with activated carbon. The pre-treatment may be usually carried out by contacting the exhaust gases with the pre-treatment cleaning agent at ordinary temperature in a superficial linear velocity of 5 cm/sec or less under atmospheric pressure.

As the pre-treatment cleaning agent, a cleaning agent composed of a metal hydroxide and/or a metal oxide is preferably used. For example, suitable as the pre-treatment cleaning agent is an acid gas-removing agent containing strontium hydroxide as a main component together with an organic binder and a hydroxide of alkaline earth metal other than strontium (Japanese Patent Application Laid-Open No. 9-99216). Examples of the organic binders include polyvinyl alcohol, polyethylene glycol, polypropylene glycol, methyl cellulose and carboxymethyl cellulose. Examples of the hydroxides of alkaline earth metal other than strontium include magnesium hydroxide, calcium hydroxide and barium hydroxide. The amount of the organic binder is usually 0.1 to 40 parts by weight based on 100 parts by weight of anhydrous strontium hydroxide. The amount of the hydroxide of alkaline earth metal other than strontium is usually 0.05 to 1 mole per mole of strontium hydroxide. Examples of other pre-treatment cleaning agents usable in the present invention include a cleaning agent composed of zinc oxide, aluminum oxide and an alkali compound (Japanese Patent Application Laid-Open No. 5-237324), a cleaning agent composed mainly of strontium hydroxide and iron oxide (Japanese Patent Application Laid-Open No. 7-308538), and the cleaning agent prepared by adherently adding sodium formate to metal oxide composed mainly of copper oxide and manganese oxide, which is also usable as the post-treatment cleaning agent as described above (Japanese Patent Application Laid-Open No.9-234337). Activated carbon is unsuitable as a component of the pre-treatment cleaning agent.

By combining the cleaning agent of the present invention with the pre-treatment cleaning agent, the cleaning of exhaust gases is efficiently performed even when the exhaust gases contain an oxidative halogen-based gas in addition to an acidic halogen-based gas.

Further, by combining the cleaning agent of the present invention with both the pre-treatment and post-treatment cleaning agents, a complete cleaning of exhaust gases is achieved even when the exhaust gases contain any kinds of halogen-based gases.

The use of the pre-treatment cleaning agent enables the simultaneous removal of chlorine, hydrogen chloride, bromine and iodine in addition to highly oxidative gases such as fluorine and chlorine trifluoride. Even when the pre-treatment cleaning agent loses its cleaning capability by cleaning halogen-based gases other than fluorine or chlorine trifluoride, the pre-treatment cleaning agent is still effective for cleaning fluorine and chlorine trifluoride because chlorine, bromine or iodine atoms already fixed thereon are replaced by fluorine atoms of highly reactive fluorine or chlorine trifluoride which is brought into contact with the pre-treatment cleaning agent. Therefore, the cleaning capability of the pre-treatment cleaning agent for fluorine or chlorine trifluoride is maintained until the pre-treatment cleaning agent is saturated with fluorine atoms. Thus, fluorine or chlorine trifluoride is prevented from entering into the cleaning agent of the present invention until the pre-treatment cleaning agent is saturated.

The cleaning method combinedly using the cleaning agent of the present invention, the pre-treatment cleaning agent and optionally the post-treatment cleaning agent is especially useful for cleaning halogen-containing exhaust gases containing at least one main gas selected from the group consisting of nitrogen, argon, helium and hydrogen, and at least one halogen-based gas selected from the group consisting of fluorine, chlorine trifluoride, chlorine, bromine, iodine, hydrogen fluoride, hydrogen chloride, hydrogen bromide, hydrogen iodide, boron trifluoride, boron trichloride, silicon tetrafluoride, silicon tetrachloride, titanium tetrachloride, aluminum chloride, germanium tetrafluoride and tungsten hexafluoride.

The optimum quantitative proportions of the pre-treatment cleaning agent, the post-treatment cleaning agent and the cleaning agent of the present invention may be easily determined based on flow rate and flow velocity of exhaust gases to be treated, purging time, etc. These cleaning agents may be packed in separate columns respectively or may be laminated one over another in a single column.

When activated carbon adherently added with no chemical agent or conventionally known activated carbons adherently added with chemical agents are used in place of the cleaning agent of the present invention, the amount of halogen-based gases desorbed from activated carbon becomes large, so that the amount of the post-treatment cleaning agent for fixing the desorbed halogen-based gases by chemical reactions must be increased. This reduces the overall cleaning capability and increases the running cost.

The present invention will be described in more detail by reference to the following examples. However, it should be noted that the following examples are illustrative and not intended to limit the invention thereto.

EXAMPLES 1 to 26
(Preparation of Cleaning Agent)

In the following preparation, 500 g of activated carbon produced by Takeda Yakuhin Kogyo Co., Ltd. under the trade name of "SHIRASAGI G2C 10/20" were used.

A predetermined amount of alkali metal form ate or alkaline earth metal formate, or a predetermined amount of a mixture of a formate of alkali metal or alkaline earth metal and a hydroxide of alkali metal or alkaline earth metal in a chemically equivalent ratio was dissolved in 200 ml of water. The activated carbons were impregnated with the resultant solution. Then, the impregnated activated carbons were died at 50° C. for 16 hours to obtain each cleaning agent.

(Measurement of Cleaning Capability)

Each cleaning agent thus prepared was packed into a SUS316L cylindrical column having an inner diameter of 39.4 mm in a packed length of 100 mm, thereby preparing each cleaning column. Nitrogen gas containing 2,000 ppm of halogen-based gas was continuously passed through the cleaning column at 25° C. in a superficial linear velocity of 2.65 cm/sec under atmospheric pressure. During the continuous flowing of the gas, a part of effluent gas from an outlet of the column was sampled and introduced into a gas-detecting tube (manufactured by Gastec Co., Ltd.) and a gas detector (TG-XA manufactured by Bionics Kiki Co., Ltd.) to detect a break-through point (point at which the concentration of halogen-based gas exceeds 1 ppm). The amount of halogen-based gas adsorbed by the cleaning agent was calculated from the amount of the halogen-based gas passed through the column until reaching the break-through point. After reaching the break-through point, nitrogen gas was allowed to pass through the cleaning column in place of nitrogen gas containing halogen-based gas, thereby purging the cleaning column for 24 hours. During the purging, the concentration of halogen-based gas in effluent nitrogen gas from the outlet was measured to determine the amount of desorbed halogen-based gas. The cleaning capability of the cleaning agent was defined as the value obtained by subtracting the measured amount of desorbed halogen-based gas from the measured amount of adsorbed halogen-based gas. The adsorbed amount, the desorbed amount and the cleaning capability were represented by the volume of halogen-based gas per liter of the cleaning agent (L/L cleaning agent). The volumes of gases in the following Examples and Comparative Examples are those at 25° C. under atmospheric pressure.

The results of cleaning tests on chlorine-containing test exhaust gases are shown in Table 1. The results of cleaning tests on boron trichloride-containing test exhaust gases are shown in Table 3 and the results of cleaning tests on test exhaust gases respectively containing different halogen-based gases are shown in Table 5.

In the following Tables, "adhered amount" represents a weight percentage of a first component, i.e., alkali metal formate and alkaline earth metal formate, based on the weight of a dried cleaning agent, or a weight percentage of a total of first and second components based on the weight of a dried cleaning agent when alkali metal hydroxide or alkaline earth metal hydroxide (second component) was adherently added in addition to the first component.

Comparative Examples 1 to 26

The procedures of Examples 1–26 were repeated using the same activated carbons as used in Examples 1–26 to prepare cleaning agents shown in Table 2. The cleaning capability of each cleaning agent was measured in the same manner as in Examples 1–26.

The results of cleaning tests on chlorine-containing test exhaust gas are shown in Table 2, and the results of cleaning tests on boron trichloride-containing test exhaust gas are shown in Table 4. In Table 6, the results of cleaning tests of activated carbon adherently added with no chemical agent against test exhaust gases containing different halogen-based gases are shown. The results of cleaning tests of activated carbon adherently added with tetramethylammonium hydroxide against test exhaust gases containing different halogen-based gases are shown in Table 7.

TABLE 1

Adhered Components of Cleaning Agents

| Examples | First component | Second component | Equivalent ratio | Adhered amount (wt. %) |
|---|---|---|---|---|
| 1 | HCOONa | None | — | 5 |
| 2 | HCOONa | None | — | 10 |
| 3 | HCOONa | None | — | 15 |
| 4 | HCOONa | NaOH | 1:1 | 5 |
| 5 | HCOONa | NaOH | 1:1 | 10 |
| 6 | HCOONa | NaOH | 1:1 | 15 |
| 7 | HCOONa | KOH | 1:1 | 10 |
| 8 | HCOONa | $Ca(OH)_2$ | 1:1 | 10 |
| 9 | HCOOK | NaOH | 1:1 | 10 |
| 10 | $(HCOO)_2Ca$ | NaOH | 1:1 | 10 |

Results of Cleaning Tests (halogen-based gas: chlorine)

| Examples | Adsorbed amount (L/L)* | Desorbed amount (L/L)* | Cleaning capability (L/L)* |
|---|---|---|---|
| 1 | 25 | 8 | 17 |
| 2 | 26 | 7 | 19 |
| 3 | 22 | 4 | 18 |
| 4 | 31 | 10 | 21 |
| 5 | 30 | 8 | 22 |
| 6 | 25 | 5 | 20 |
| 7 | 29 | 9 | 20 |
| 8 | 28 | 9 | 19 |
| 9 | 28 | 10 | 18 |
| 10 | 26 | 8 | 18 |

Note: *liter/liter of cleaning agent.

TABLE 2

Adhered Components of Cleaning Agents

| Comparative Examples | First component | Second component | Equivalent ratio | Adhered amount (wt. %) |
|---|---|---|---|---|
| 1 | None | None | — | — |
| 2 | HCOONa | None | — | 20 |
| 3 | $Na_3AlO_3$ | None | — | 10 |
| 4 | $[(CH_3)_4N]OH$ | None | — | 10 |
| 5 | NaOH | None | — | 10 |
| 6 | HCOONa | NaOH | 1:1 | 1 |
| 7 | HCOONa | NaOH | 1:1 | 20 |

Results of Cleaning Tests (halogen-based gas: chlorine)

| Comparative Examples | Adsorbed amount (L/L)* | Desorbed amount (L/L)* | Cleaning capability (L/L)* |
|---|---|---|---|
| 1 | 25 | 13 | 12 |
| 2 | 5 | 1 | 4 |
| 3 | 16 | 8 | 8 |
| 4 | 19 | 7 | 12 |
| 5 | 17 | 7 | 10 |
| 6 | 19 | 9 | 10 |
| 7 | 6 | 1 | 5 |

Note: *liter per liter of cleaning agent.

TABLE 3

Adhered Components of Cleaning Agents

| Examples | First component | Second component | Equivalent ratio | Adhered amount (wt. %) |
|---|---|---|---|---|
| 11 | HCOONa | None | — | 5 |
| 12 | HCOONa | None | — | 10 |
| 13 | HCOONa | None | — | 15 |
| 14 | HCOONa | NaOH | 1:1 | 5 |
| 15 | HCOONa | NaOH | 1:1 | 10 |
| 16 | HCOONa | NaOH | 1:1 | 15 |
| 17 | HCOONa | KOH | 1:1 | 10 |
| 18 | HCOONa | $Ca(OH)_2$ | 1:1 | 10 |
| 19 | HCOOK | NaOH | 1:1 | 10 |
| 20 | $(HCOO)_2Ca$ | NaOH | 1:1 | 10 |

Results of Cleaning Tests (halogen-based gas: boron trichloride)

| Examples | Adsorbed amount (L/L)* | Desorbed amount (L/L)* | Cleaning capability (L/L)* |
|---|---|---|---|
| 11 | 20 | 7 | 13 |
| 12 | 20 | 7 | 13 |
| 13 | 19 | 6 | 13 |
| 14 | 20 | 5 | 15 |
| 15 | 21 | 4 | 17 |
| 16 | 19 | 3 | 16 |
| 17 | 20 | 5 | 15 |
| 18 | 21 | 8 | 13 |
| 19 | 21 | 7 | 14 |
| 20 | 19 | 5 | 14 |

Note: *liter per liter of cleaning agent.

TABLE 4

Adhered Components of Cleaning Agents

| Comparative Examples | First component | Second component | Equivalent ratio | Adhered amount (wt %) |
|---|---|---|---|---|
| 8 | None | None | — | 20 |
| 9 | HCOONa | None | — | 20 |
| 10 | $Na_3AlO_3$ | None | — | 10 |
| 11 | $[(CH_3)_4N]OH$ | None | — | 10 |
| 12 | NaOH | None | — | 10 |
| 13 | HCOONa | NaOH | 1:1 | 1 |
| 14 | HCOONa | NaOH | 1:1 | 20 |

Results of Cleaning Tests (halogen-based gas: boron trichloride)

| Comparative Examples | Adsorbed amount (L/L)* | Desorbed amount (L/L)* | Cleaning capability (L/L)* |
|---|---|---|---|
| 8 | 20 | 12 | 8 |
| 9 | 5 | 1 | 4 |
| 10 | 15 | 8 | 7 |
| 11 | 16 | 7 | 9 |
| 12 | 16 | 7 | 9 |
| 13 | 18 | 10 | 8 |
| 14 | 5 | 1 | 4 |

Note: *liter per liter of cleaning agent.

TABLE 5

Adhered Components of Cleaning Agents

| Examples | First component | Second component | Equivalent ratio | Adhered amount (wt. %) |
|---|---|---|---|---|
| 21 | HCOONa | NaOH | 1:1 | 10 |
| 22 | HCOONa | NaOH | 1:1 | 10 |
| 23 | HCOONa | NaOH | 1:1 | 10 |
| 24 | HCOONa | NaOH | 1:1 | 10 |

TABLE 5-continued

| | | | | |
|---|---|---|---|---|
| 25 | HCOONa | NaOH | 1:1 | 10 |
| 26 | HCOONa | NaOH | 1:1 | 10 |

Results of Cleaning Tests

| Examples | Halogen-based gas | Adsorbed amount (L/L)* | Desorbed amount (L/L)* | Cleaning capability (L/L)* |
|---|---|---|---|---|
| 21 | HCl | 52 | 11 | 41 |
| 22 | $BF_3$ | 32 | 7 | 25 |
| 23 | $WF_6$ | 23 | 3 | 20 |
| 24 | $SiF_4$ | 23 | 4 | 19 |
| 25 | $Br_2$ | 29 | 8 | 21 |
| 26 | HBr | 49 | 10 | 39 |

Note: *liter per liter of cleaning agent

TABLE 6

Adhered Components of Cleaning Agents

| Comparative Examples | First component | Second component | Equivalent ratio | Adhered amount (wt. %) |
|---|---|---|---|---|
| 15 | None | None | — | — |
| 16 | None | None | — | — |
| 17 | None | None | — | — |
| 18 | None | None | — | — |
| 19 | None | None | — | — |
| 20 | None | None | — | — |

Results of Cleaning Tests

| Comparative Examples | Halogen-based gas | Adsorbed amount (L/L)* | Desorbed amount (L/L)* | Cleaning *capability (L/L)* |
|---|---|---|---|---|
| 15 | HCl | 16 | 8 | 8 |
| 16 | $BF_3$ | 29 | 17 | 12 |
| 17 | $WF_6$ | 22 | 8 | 14 |
| 18 | $SiF_4$ | 20 | 9 | 11 |
| 19 | $Br_2$ | 24 | 15 | 9 |
| 20 | HBr | 15 | 8 | 7 |

Note: *liter per liter of cleaning agent.

TABLE 7

Adhered Components of Cleaning Agents

| Comparative Examples | First component | Second component | Equivalent ratio | Adhered amount (wt. %) |
|---|---|---|---|---|
| 21 | [$(CH_3)_4N$]OH | None | — | 10 |
| 22 | [$(CH_3)_4N$]OH | None | — | 10 |
| 23 | [$(CH_3)_4N$]OH | None | — | 10 |
| 24 | [$(CH_3)_4N$]OH | None | — | 10 |
| 25 | [$(CH_3)_4N$]OH | None | — | 10 |
| 26 | [$(CH_3)_4N$]OH | None | — | 10 |

Results of Cleaning Tests

| Comparative Examples | Halogen-based gas | Adsorbed amount (L/L)* | Desorbed amount (L/L)* | Cleaining *capability (L/L)* |
|---|---|---|---|---|
| 21 | HCl | 39 | 15 | 24 |
| 22 | $BF_3$ | 28 | 12 | 16 |
| 23 | $WF_6$ | 22 | 7 | 15 |
| 24 | $SiF_4$ | 21 | 7 | 14 |

TABLE 7-continued

| 25 | $Br_2$ | 25 | 14 | 11 |
|---|---|---|---|---|
| 26 | HBr | 38 | 14 | 24 |

Note: *liter per liter of cleaning agent.

EXAMPLE 27

Strontium hydroxide, calcium hydroxide and polyvinyl alcohol were kneaded in a weight ratio of 75:23:2, extruded and then dried as described in Japanese Patent Application Laid-Open No. 9-99216, thereby preparing a cleaning agent. The cleaning agent was packed into a cylindrical column of the same type as used in Examples 1–26 in a packed length of 50 mm, thereby a first cleaning column (pre-treatment cleaning column).

Separately, the cleaning agent prepared in Example 5 was packed into a cylindrical column of the same type as used in Examples 1–26 in a packed 680 mm, thereby producing a second cleaning column.

Cleaning tests were carried out at 25° C. under atmospheric pressure. More specifically, the first cleaning column and the second cleaning column disposed on the downstream of the first cleaning column were connected tube. Nitrogen gas containing 2,000 ppm fluorine was allowed to flow from the first cleaning column at a superficial linear velocity of 2.65 cm/sec for 12 hours. Then, after nitrogen gas containing 4,000 ppm chlorine was allowed to flow through the first and second cleaning columns at a superficial linear velocity of 2.65 for 8 hours, the columns were purged with nitrogen for 16 hours. These procedures were cycled repeatedly. During the above procedures, the time required until the concentration of halogen-based gas in the effluent gas from the second cleaning column exceeded 1 ppm was measured using a gas detector ("TG-XA" manufactured by Bionics Kiki Co., Ltd.), thereby calculating the amount of chlorine gas passed through the columns. As a result, the amount of chlorine gas passed through the columns was 41.4 liters and the adsorbed amount was 50 liters per liter of the second cleaning agent.

After the cleaning test, the respective cleaning agents in the first and second cleaning columns were analyzed by an energy-dispersive X-ray diffractometer. The results showed that fluorine was detected only from the cleaning agent packed in the first cleaning column, and no fluorine was detected from the cleaning agent packed in the second cleaning column.

EXAMPLE 28

The same cleaning test as described in Example 27 was repeated except that boron trichloride was used in place of chlorine. As a result, the amount of boron trichloride passed through the columns was 24.8 liters and the adsorbed amount was 30 liters per liter of the second cleaning agent.

Further, the results of energy-dispersive X-ray analysis showed that fluorine was detected only from the cleaning agent packed in the first cleaning column.

EXAMPLE 29

Hopcalite was adherently added with sodium formate in an amount of 20% by weight and dried at 50° C. as described in Japanese Patent Application Laid-Open No. 9-234337 to prepare a cleaning agent. The cleaning agent was packed into a cylindrical column of the same type as used in Examples 1–26 in a packed length of 120 mm, thereby producing a third cleaning column (post-treatment cleaning column). The same first and second cleaning columns as used in Example 27 and the third cleaning column were disposed in this order from the upstream side toward the downstream side, and the cleaning test was conducted at 25° C. under atmospheric pressure.

Nitrogen gas containing 2,000 ppm of fluorine was allowed to flow from the first cleaning column at a superficial linear velocity of 2.65 cm/sec for 12 hours. Then, after nitrogen gas containing 4,000 ppm of chlorine and 4,000 ppm of boron trichloride was flowed at a superficial linear velocity of 2.65 cm/sec for 8 hours, the columns were purged with nitrogen for 16 hours. These procedures were cycled repeatedly. During the above procedures, a part of the effluent gas was sampled from a sampling port provided between the second and third cleaning columns to measure the time required until the concentration of the halogen-based gas in the effluent gas exceeded 1 ppm (break-through point) by a gas detector (TG-XA manufactured by Bionics Kiki Co., Ltd.). The amount of the halogen-based gas flowed through the columns was calculated from the measured value.

After reaching the break-through point, the columns were purged with nitrogen at a superficial linear velocity of 2.65 cm/sec, and the time required until the concentration of the halogen-based gas in the effluent gas from the third cleaning column exceeded 1 ppm was measured by a gas detector (TG-XA manufactured by Bionics Kiki Co., Ltd.).

As a result, the amounts flowed through the columns until reaching the break-through point of the second cleaning column were 16.6 liters for each of chlorine and boron trichloride, and the total amount of adsorbed chloride and boron trichloride was 40 liters per liter of the second cleaning agent. Further, the time required until chlorine gas was first detected in the effluent gas from the third cleaning column was 45 hours after initiating the nitrogen purge.

Comparative Example 27

The same procedures as described in Example 29 were repeated except that the cleaning agent in the second cleaning column was replaced by activated carbon added with no chemical agent.

As a result, the amounts passed through the columns until reaching the break-through point of the second cleaning column were 13.5 liters for each of chlorine and boron trichloride, and the total amount of adsorbed chlorine and boron trichloride was 32 liters per liter of activated carbon. Further, the time required until chlorine gas was first detected in the effluent gas from the third cleaning column was 18 hours after initiating the nitrogen purge.

EXAMPLE 30

The cleaning agent prepared in Example 5 was packed into a cylindrical column of the same type as used in Examples 1–26 in a packed length of 680 mm, thereby producing a first cleaning column. The hopcalite prepared in Example 29 was packed into another cylindrical column in a packed length of 120 mm, thereby producing a second cleaning column (post-treatment cleaning column). The second cleaning column was disposed on the downstream of the first cleaning column, and connected thereto through a tube provided with a sampling port.

After nitrogen gas containing 4,000 ppm of chlorine and 4,000 ppm of boron trichloride was passed through the first and second columns at a superficial linear velocity of 2.65 cm/sec for 8 hours, the columns were purged with nitrogen for 16 hours. These procedures were cycled repeatedly. During the above procedures, a part of the effluent gas from the first cleaning column was sampled from the sampling port to measure the time required until the concentration of halogen-based gas exceeded 1 ppm (break-through point) by a gas detector (TG-XA manufactured by Bionics Kiki Co., Ltd.). The amount of halogen-based gas flowed through the columns was calculated from the measured value.

After reaching the break-through point, the columns were purged with nitrogen at a superficial linear velocity of 2.65 cm/sec, and the time required until the concentration of halogen-based gas in the effluent gas from the second cleaning column exceeded 1 ppm was measured by a gas detector (TG-XA manufactured by Bionics Kiki Co., Ltd.).

As a result, the amounts flowed through the columns until reaching the break-through point were 16.6 liters for each of chlorine and boron trichloride, and the total amount of adsorbed chlorine and boron trichloride was 40 liters per liter of the first cleaning agent. Further, the time required until chlorine gas was first detected in the effluent gas from the second cleaning column was 45 hours after initiating the nitrogen purge.

EXAMPLES 31 to 32

A cleaning agent composed of activated carbon adherently added with alkaline earth metal formate (Example 31) and a cleaning agent composed of activated carbon adherently added with alkali metal formate and alkaline earth metal formate in an amount of 10% by weight in total at an equivalent ratio of 1:1 (Example 32) were prepared in the same manner as in Examples 1–26.

The cleaning capability of the cleaning agents were measured in the same manner as in Examples 1–26. The results are shown in Table 8.

TABLE 8

Adhered Components of Cleaning Agents

| Examples | First component | Second component | Equivalent ratio | Adhered (wt. %) |
|---|---|---|---|---|
| 31 | $(HCOO)_2Ca$ | None | — | 5 |
| 32 | $HCOONa$ $(HCOO)_2Ca$ | None | — | 10 |

Results of Cleaning Tests

| Examples | Halogen-based gas | Adsorbed amount (L/L)* | Desorbed amount (L/L)* | Cleaning *capability (L/L)* |
|---|---|---|---|---|
| 31 | $Cl_2$ | 25 | 8 | 17 |
| 32 | $Cl_2$ | 27 | 8 | 19 |

Note: *liter per liter of cleaning agent.

INDUSTRIAL APPLICABILITY

The cleaning agents and the cleaning processes according to the present invention have the following excellent effects, and are useful for cleaning exhaust gases containing noxious halogen-based gases from etching process of semiconductor production.

(1) Large cleaning capability is attained because the desorbed amount of halogen-based gases from the cleaning agent is considerably reduced.
(2) The cleaning agent is prepared at low production cost from activated carbon and formate, or activated carbon, formate and hydroxide.
(3) Halogen-based gases are completely removed by disposing a cleaning agent prepared by adherently adding sodium formate to a metal oxide on the downstream side of the cleaning agent of the present invention.

(4) Cleaning of halogen-based gases containing fluorine or chlorine trifluoride is safely performed by disposing a cleaning agent composed of a metal oxide and/or a metal hydroxide on the upstream side of the cleaning agent according to the present invention.

(5) Exhaust gases containing any kinds of halogen-based gases is completely and safely cleaned with great cleaning efficiency by disposing a cleaning agent composed of a metal oxide and/or a metal hydroxide on the upstream side of the cleaning agent of the present invention, and disposing a cleaning agent prepared by adherently adding sodium formate to a metal oxide on the downstream side of the cleaning agent of the present invention.

What is claimed is:

1. A process for cleaning a halogen-based gas containing exhaust gas, comprising:
   contacting an exhaust gas containing a halogen-based gas as noxious component with a cleaning agent comprising activated carbon adherently added with an alkali metal formate and/or an alkaline earth metal formate;
   wherein the halogen-based gas is at least one gas selected from the group consisting of fluorine, chlorine, bromine, iodine, hydrogen fluoride, hydrogen bromide, hydrogen iodide, chlorine trifluoride, boron trifluoride, boron trichloride, silicon tetrafluoride, silicon tetrachloride, titanium tetrachloride, aluminum chloride, germanium tetrafluoride and tungsten hexafluoride.

2. The process according to claim 1, wherein an adhered amount of the alkali metal formate and/or alkaline earth metal formate is 3 to 18% by weight (dry basis) based on the weight of the cleaning agent.

3. A process for cleaning a halogen-based gas containing exhaust gas, comprising:
   contacting an exhaust gas containing a halogen-based gas as noxious component with a cleaning agent comprising activated carbon adherently added with an alkali metal hydroxide and/or an alkaline earth metal hydroxide in addition to an alkali metal formate and/or an alkaline earth metal formate;
   wherein the halogen-based gas is at least one gas selected from the group consisting of fluorine, chlorine, bromine, iodine, hydrogen fluoride, hydrogen bromide, hydrogen iodide, chlorine trifluoride, boron trifluoride, boron trichloride, silicon tetrafluoride, silicon tetrachloride, titanium tetrachloride, aluminum chloride, germanium tetrafluoride and tungsten hexafluoride.

4. The process according to claim 3, wherein a total amount of the alkali metal formate and/or alkaline earth metal formate and the alkali metal hydroxide and/or alkaline earth metal hydroxide is 3 to 18% by weight (dry basis) based on the weight of the cleaning agent.

5. The process according to claim 3, wherein a ratio of equivalent amount of the alkali metal formate and/or alkaline earth metal formate to the alkali metal hydroxide and/or alkaline earth metal hydroxide is 1:0.1–3.0.

6. The process according to claims 1 or 3, further comprising a post-treatment step of contacting the exhaust gas containing the halogen-based gas with a cleaning agent comprising a metal oxide adherently added with sodium formate.

7. The process according to claims 1 or 3, further comprising a pre-treatment step of contacting the exhaust gas containing the halogen-based gas with a cleaning agent comprising a metal oxide and/or a metal hydroxide.

8. The process according to claims 1 or 3, further comprising a pre-treatment step of contacting the exhaust gas containing the halogen-based gas with a cleaning agent comprising a metal oxide and/or a metal hydroxide; and
   a post-treatment step of contacting the exhaust gas containing the halogen-based gas with a cleaning agent comprising a metal oxide adherently added with sodium formate.

9. A cleaning agent for a halogen-based gas containing exhaust gas, comprising:
   activated carbon adherently added with an alkali metal formate and/or an alkaline earth metal formate;
   wherein an adhered amount of the alkali metal formate and/or the alkaline earth metal formate is 3 to 18% by weight based on the weight of the dry cleaning agent;
   wherein said exhaust gas contains the halogen-based gas as a noxious component; and
   wherein said halogen-based gas is at least one gas selected from the group consisting of fluorine, chlorine, bromine, iodine, hydrogen fluoride, hydrogen bromide, hydrogen iodide, chlorine trifluoride, boron trifluoride, boron trichloride, silicon tetrafluoride, silicon tetrachloride, titanium tetrachloride, aluminum chloride, germanium tetrafluoride and tungsten hexafluoride.

10. The cleaning agent according to claim 9, wherein said activated carbon is selected from the group consisting of a coal activated carbon, a charcoal activated carbon and a coconut shell activated carbon.

11. The cleaning agent according to claim 9, wherein said alkali formate is sodium formate, potassium formate or a mixture thereof.

12. The cleaning agent according to claim 9, wherein said alkaline earth metal formate is calcium formate, magnesium formate, barium formate, strontium formate or a mixture thereof.

13. A cleaning agent for a halogen-based gas containing exhaust gas, comprising:
   activated carbon adherently added with an alkali metal hydroxide and/or an alkaline earth metal hydroxide in addition to an alkali metal formate and/or an alkaline earth metal formate;
   wherein a total adhered amount of the alkali metal formate and/or the alkaline earth metal formate and the alkali metal hydroxide and/or the alkaline earth metal hydroxide is 3 to 18% by weight based on the weight of the dry cleaning agent;
   wherein said exhaust gas contains the halogen-based gas as a noxious component; and
   wherein the halogen-based gas is at least one gas selected from the group consisting of fluorine, chlorine, bromine, iodine, hydrogen fluoride, hydrogen bromide, hydrogen iodide, chlorine trifluoride, boron trifluoride, boron trichloride, silicon tetrafluoride, silicon tetrachloride, titanium tetrachloride, aluminum chloride, germanium tetrafluoride and tungsten hexafluoride.

14. The cleaning agent according to claim 13, wherein a ratio of equivalent amount of the alkali metal formate and/or alkaline earth metal formate to the alkali metal hydroxide and/or alkaline earth metal hydroxide is 1:0.1–3.0.

15. The cleaning agent according to claim 13, wherein said alkali metal hydroxide is selected from the group consisting of lithium hydroxide, sodium hydroxide, potassium hydroxide, and a mixture thereof.

16. The cleaning agent according to claim 13, wherein said alkaline earth metal hydroxide is selected from the group consisting of calcium hydroxide, barium hydroxide, strontium hydroxide, magnesium hydroxide and a mixture thereof.

17. The cleaning agent according to claim 13, wherein a ratio of the formate to the hydroxide is 1:0.1 to 1:3.0.

* * * * *